United States Patent
Dettinger et al.

(10) Patent No.: US 7,461,052 B2
(45) Date of Patent: Dec. 2, 2008

(54) ABSTRACT QUERY PLAN

(75) Inventors: Richard D. Dettinger, Rochester, MN (US); Daniel P. Kolz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 11/005,418

(22) Filed: Dec. 6, 2004

(65) Prior Publication Data

US 2006/0122993 A1 Jun. 8, 2006

(51) Int. Cl.
*G06F 7/00* (2006.01)
*G06F 17/30* (2006.01)

(52) U.S. Cl. .................... 707/3; 707/2; 707/4; 707/5; 707/6

(58) Field of Classification Search .............. 707/3, 707/1–2, 4–6
See application file for complete search history.

(56) References Cited

U.S. PATENT DOCUMENTS

| | | | | |
|---|---|---|---|---|
| 5,471,611 | A * | 11/1995 | McGregor | 707/4 |
| 6,442,543 | B1 * | 8/2002 | Snodgrass et al. | 707/3 |
| 6,725,227 | B1 | 4/2004 | Li | |
| 2003/0172056 | A1 * | 9/2003 | Dettinger et al. | 707/3 |
| 2004/0148278 | A1 * | 7/2004 | Milo et al. | 707/3 |
| 2004/0267760 | A1 * | 12/2004 | Brundage et al. | 707/100 |

OTHER PUBLICATIONS

U.S. Appl. No. 10/083,075, "Application Portability and Extensibility Through Database Schema and Query Abstraction", filed Feb. 26, 2002 (ROC920020044US1).
U.S. Appl. No. 10/403,356, "Abstract Query Plan", filed Mar. 31, 2003 (ROC920030008US1).

* cited by examiner

*Primary Examiner*—Jean B. Fleurantin
*Assistant Examiner*—Hares Jami
(74) *Attorney, Agent, or Firm*—Patterson & Sheridan, LLP

(57) ABSTRACT

A method and apparatus, and article of manufacture are provided to process an abstract query of a database abstraction constructed over an underlying physical data storage mechanism. The database may comprise a single data source, or a federated source spanning multiple systems. Embodiments of the invention process an abstract query by generating an intermediate representation of the abstract query. In one embodiment, the intermediate representation comprises an abstract query plan. An abstract query plan includes a combination of elements from the data abstraction model and elements relating to the underlying physical data storage mechanism. Once generated, a back-end component may easily traverse the abstract query plan to generate an SQL statement (or other resolved query) corresponding to the abstract query. Further, once constructed, the abstract query plan provides a platform for many different optimizations that may be selected by a user or by the runtime component inspecting the abstract query plan prior to creating the resolved query.

10 Claims, 8 Drawing Sheets

ABSTRACT QUERY PLAN

CROSS-REFERENCE TO RELATED APPLICATIONS

This application is related to a commonly owned, co-pending U.S. patent application Ser. No. 10/083,075, filed Feb. 26, 2002, entitled "Application Portability and Extensibility through Database Schema and Query Abstraction" which is incorporated herein by reference in its entirety. This application is also related to a commonly owned, co-pending application entitled, "Dealing with Composite Data through Data Model Entities," application Ser. No. 10/403,356 filed on Mar. 31, 2003 incorporated herein by reference in its entirety.

BACKGROUND OF THE INVENTION

1. Field of the Invention

This invention is related to computer databases. More specifically, this application is related to methods for creating an abstraction of a physical data storage mechanism and for constructing a resolved query of the physical data storage mechanism from an abstract query.

2. Description of the Related Art

Databases are well known systems for information storage and retrieval. The most prevalent type of database in use today is the relational database, a tabular database in which data is defined so that it can be reorganized and accessed in a number of different ways. A relational database management system (DBMS) uses relational techniques for storing and retrieving data.

A database schema is used to describe the structure of a database. For example, a relational schema describes the set of tables, columns, and primary and foreign keys defining relationships between different tables in a relational database. Applications are developed that query data according to the relational schema. For example, relational databases are commonly accessed using a front-end application configured to perform data access routines, including searching, sorting, and query composition routines. At the back-end, software programs control data storage and respond to queries submitted by users interacting with the front-end.

Structured Query Language (SQL) is a widely used database language that provides a means for data manipulation, and includes commands to retrieve, store, update, and delete data. An SQL query is constructed according to the relational schema for a given relational database, and according to the explicitly defined SQL grammar. An SQL query comprises a text string that must strictly conform to the grammar requirements of the SQL language and must also be semantically correct to perform as desired by the user. That is, many syntactically correct SQL statements may fail to perform as desired due to semantic errors. Because of this complexity, database query applications are often used to assist a user in composing an SQL query of a relational database.

One issue faced by data mining and database query applications, however, is their close relationship with a given database schema. This relationship makes it difficult to support an application as changes are made to the corresponding underlying database schema. Further, this tightly bound relationship inhibits the migration of the application to alternative data representations.

Commonly assigned U.S. patent application Ser. No. 10/083,075 (the '075 application), filed Feb. 26, 2002, entitled "Application Portability and Extensibility through Database Schema and Query Abstraction", discloses a framework for a data abstraction model that provides an abstract view of a physical data storage mechanism. The framework of the '075 application provides a requesting entity (i.e., an end-user or front-end application) with an abstract representation of data stored in an underlying physical storage mechanism, such as a relational database. In this way, the requesting entity is decoupled from the underlying physical data when accessing the underlying DBMS. Abstract queries based on the framework can be constructed without regard for the makeup of the underlying database. Further, changes to the schema for the database do not also require a corresponding change in the query application front-end; rather, the abstraction provided by the framework can be modified to reflect the changes.

One embodiment of a data abstraction model defines a set of logical fields, corresponding to a users' substantive view of data, which are loosely coupled to the underlying physical databases storing the data. The logical fields are available for a user to compose queries that search, retrieve, add, and modify data stored in the underlying database. The abstract query is used to generate an SQL query statement processed by a relational DBMS. Additional challenges arise when transforming an abstract query, which comprises a highly logical view of data structured in the form of objects, such as logical fields, into an SQL text string (e.g., a SELECT, INSERT, or DELETE statements). Chief among these problems is the difficulty of efficiently generating an SQL query directly from the abstract query. Different pieces of the abstract query may relate to one another in non-obvious ways, and therefore, the query builder must look forward and backward through the abstract query to correctly build the piece of the query currently being considered. The query builder, however, may not be able to inspect the SQL being generated from the abstract query to determine the information it needs. In particular, this makes it harder for the query builder to determine if the SQL is fully optimized, or to make adjustments in the query design. First, the SQL would need to be reparsed, despite it being in a fragmented and incomplete state during the query building process. Second, the SQL statement does not always contain all of the information from the abstract query, because some information is lost when the abstract query is converted to SQL.

Accordingly, there is a need for techniques to provide further improvements to efficiently generate and optimize a query of an underlying physical storage mechanism, such as an SQL query of a relational DBMS, and for abstract query processing techniques generally.

SUMMARY OF THE INVENTION

The present invention generally provides techniques for processing an abstract query. Rather than generate a resolved query statement (e.g., SQL statement) directly from an abstract query, embodiments of the invention first generate an intermediate representation of the abstract query. In one embodiment, the intermediate representation comprises an abstract query plan. The abstract query plan includes a combination of abstract elements from the data abstraction model and elements relating to the underlying physical data storage mechanism. For a data abstraction model constructed over a relational database, an abstract query plan contains all the information about which relational tables need to be available, and how to join the tables together (i.e., the relationships between the tables or between the logical fields, conditions on data retrieved.) In one embodiment, an abstract query plan may be implemented using a tree-type data structure that stores this information. Once generated, a back-end component may traverse the abstract query plan to generate an SQL statement corresponding to the abstract query.

One embodiment of the invention provides a method of accessing data in a database. The method generally includes receiving, from a requesting entity, an abstract query composed from a plurality of logical fields, wherein each logical field specifies (i) a name used to identify the logical field, and (ii) an access method that maps the logical field to a data source in the database. The method generally further includes generating, from the abstract query, an intermediate representation of the abstract query that indicates the logical fields and access methods included in the abstract query, the data sources within the database containing the data, and the relationships between the data sources in the database, and generating, from the intermediate representation, a resolved query of the database.

Another embodiment of the invention provides a method of providing an abstraction of a relational database. The method generally includes defining a data abstraction model, wherein the data abstraction model comprises: a plurality of logical fields, wherein each logical field identifies a name for the logical field and an access method maps the logical field to a data source in the relational database, an indication of the relationships between logical fields, and a graph representation of the relational database that identifies the relationships between data sources in the relational database. The method generally further includes providing a query building interface configured to allow a user to compose an abstract query from the plurality of logical fields and providing a runtime component configured to process an abstract query to generate a resolved query of the relational database from the abstract query.

Another embodiment of the invention provides a method of processing an abstract query. The method generally includes receiving, from a requesting entity, an abstract query composed from a plurality of logical fields, wherein each logical field specifies (i) a name used to identify the logical field, (ii) an access method that maps the logical field to a data source in a database. The method generally further includes identifying (i) a set of data sources referenced by the plurality of logical fields in the abstract query and (ii) a set of relationships between the set of data sources, determining an acyclic graph representation of the set of data sources and a set of relationships between the set of data source and generating an abstract query plan, and traversing the abstract query plan to generate a resolved query of the data sources. In one embodiment, the abstract query plan comprises a plurality of table instances, wherein the each table instance includes an indication of a data source, each of the logical fields included in the abstract query that depend on data present on the indicated data source, and conditions used to limit the data selected from the indicated data source, and wherein the abstract query plan further comprises a set of join relationships that indicate how the plurality of table instances are related to one another relative to the abstract query.

Another embodiment of the invention provides a method of processing an abstract query. The method generally comprises, receiving, from a requesting entity, an abstract query composed from a plurality of logical fields, wherein each logical field specifies (i) a name used to identify the logical field, (ii) an access method that maps the logical field to a data source in a database, and identifying (i) a set of data sources referenced by the plurality of logical fields in the abstract query and (ii) a set of relationships between the set of data sources. The method generally further comprises, determining an acyclic graph representation of the set of data sources, generating an abstract query plan, wherein the abstract query plan comprises, (a) a plurality of table instances, wherein each table instance includes (i) an indication of a data source; (ii) each of the logical fields included in the abstract query that depend on data present on the indicated data source; and (iii) conditions used to limit the data selected from the indicated data source; and (b) a set of join relationships that indicate how the plurality of table instances are related to one another. And wherein the method further comprises, performing at least one optimization of the abstract query plan to generate an optimized abstract query plan, and traversing the optimized abstract query plan to generate a resolved query of the data sources.

Another embodiment of the invention provides a computer-readable medium containing a plurality of instructions which, when executed on a computer system is configured to perform operations. The operations generally include defining a data abstraction model, wherein the data abstraction model comprises a plurality of logical fields, wherein each logical field identifies a name for the logical field and an access method that maps the logical field to a data source in a relational database, an indication of the relationships between logical fields, and a graph representation of the relational database that identifies the relationships between data sources in the relational database. The operations generally further include providing a query building interface configured to allow the composition of an abstract query from the plurality of logical fields, and providing a runtime component configured to process an abstract query to generate a resolved query of the relational database from the abstract query.

Another embodiment of the invention provides a system for processing an abstract query. The system generally includes a data abstraction model, wherein the data abstraction model includes (i) a plurality of logical fields, wherein each logical field specifies (a) a name used to identify the logical field, and (b) an access method that maps the logical field to data in the database, (ii) a graph representation of an underlying physical data storage mechanism abstracted by the data abstraction model. The system generally further includes a user interface configured to allow a user to compose an abstract query from the plurality of logical fields, and a runtime component configured to receive an abstract query, and in response, to generate an abstract query plan, and to traverse the abstract query plan to generate a resolved query. In one embodiment, the abstract query plan includes (i) a plurality of table instances, wherein each table instance includes an indication of a data source, each of the logical fields included in the abstract query that depend on data present on the indicated data source, and conditions used to limit the data selected from the indicated data source; and the abstract query plan further includes (ii) a set of join relationships that indicate how the plurality of table instances are related to one another relative to the abstract query.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

The appended drawings, however, illustrate typical embodiments of this invention and should not, therefore, be considered limiting of its scope, for the invention may admit to other equally effective embodiments.

DETAILED DESCRIPTION OF THE PREFERRED EMBODIMENTS

Figure 1:
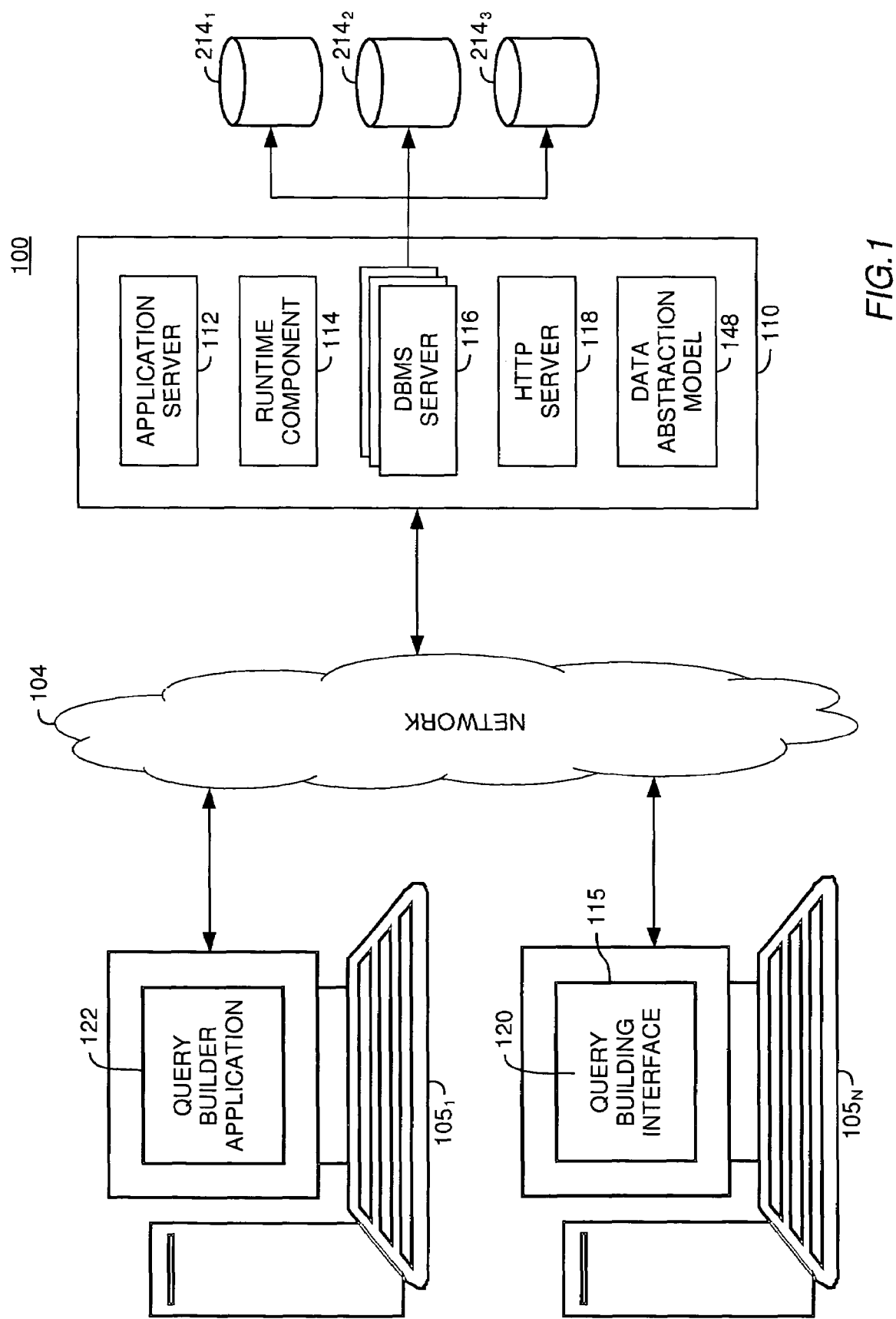
FIG. 1 illustrates a relational view of software and hardware components, according to one embodiment of the invention.

The present invention provides methods, systems, and articles of manufacture used to create a data abstraction model and to process a query of the model. The data abstraction model provides an interface to the data stored in a database that conforms to a user's substantive view of the data, instead of a view corresponding with the schema of the database. When a user composes an abstract query, embodiments of the invention provide techniques for transforming between these two views, i.e., for creating a query of the underlying database from the abstract query. Such a query is sometimes referred to herein as a "resolved" query or "physical" query. In a preferred embodiment, where the underlying storage mechanism is a relational database, such a query comprises an SQL query statement. It should be understood, however, that references to specific query languages, such as SQL, are used to illustrate embodiments of the invention and application to other query languages is contemplated.

Embodiments of the invention provide a multi-step process to generate a resolved query from an abstract query. In one embodiment, an abstract query is first used to construct an intermediate representation of the abstract query. This intermediate representation is then used to create a resolved query. In one embodiment, the intermediate representation comprises an abstract query plan (AQP) that includes a combination of physical data (e.g., tables and columns of a relational database) and logical data (e.g., logical fields defined by a data abstraction model). The abstract query plan describes the relationships and interactions between all parts of the abstract query and corresponding data sources present in the underlying database. The abstract query plan incorporates information about which logical fields are selected from which physical entities and which conditions are applied to which physical entities. Further, the abstract query plan provides a platform for additional optimizations used to generate an improved version of a resolved query.

In the following description, reference is made to embodiments of the invention. The invention is not, however, limited to any specifically described embodiment. Rather, any combination of the following features and elements, whether related to a described embodiment or not, implements and practices the invention. Furthermore, in various embodiments the invention provides numerous advantages over the prior art. Although embodiments of the invention may achieve advantages over other possible solutions and the prior art, whether a particular advantage is achieved by a given embodiment does not limit the scope of the invention. Thus, the following aspects, features, embodiments and advantages are illustrative and are not considered elements or limitations of the appended claims except where explicitly recited in a claim. Likewise, references to "the invention" shall neither be construed as a generalization of any inventive subject matter disclosed herein nor considered an element or limitation of the appended claims except where explicitly recited in a claim.

One embodiment of the invention is implemented as a program product for use with a computer system such as, for example, the computer system 100 shown in FIG. 1 and described below. The program product defines functions of the embodiments (including the methods) described herein and can be contained on a variety of signal-bearing media. Illustrative signal-bearing media include, without limitation, (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed across communications media, (e.g., a computer or telephone network) including wireless communications. The latter embodiment specifically includes information shared over the Internet or other large computer networks. Such signal-bearing media, when carrying computer-readable instructions that perform methods of the invention, represent embodiments of the present invention.

In general, software routines implementing embodiments of the invention may be part of an operating system or part of a specific application, component, program, module, object, or sequence of instructions such as an executable script. Such software routines typically comprise a plurality of instructions capable of being performed using a computer system. Also, programs typically include variables and data structures that reside in memory or on storage devices as part of their operation. In addition, various programs described herein may be identified based upon the application for which they are implemented. Those skilled in the art recognize, however, that any particular nomenclature or specific application that follows facilitates a description of the invention and does not limit the invention for use solely with a specific application or nomenclature. Furthermore, the functionality of programs described herein use discrete modules or components interacting with one another. Those skilled in the art recognize, however, that different embodiments may combine or merge such components and modules in many different ways.

Physical View of the Environment

FIG. 1 illustrates a networked computer system in a client-server configuration. Client computer systems $105_{1-N}$ include a network interface allowing them to communicate with other systems over network 104. The network 104 may comprise a local area network wherein both the client system 105 and server system 110 reside in the same general location, or may comprise network connections between geographically distributed systems, including network connections over the Internet. Client system 105 generally includes a central processing unit (CPU) connected via a bus, to memory and storage (not shown). Client system 105 is running an operating system, (e.g., a Linux® distribution, Microsoft Windows®, IBM's AIX®, FreeBSD, and the like) that manages the interaction between hardware components and higher-level software applications running on client system 105.

In one embodiment, a user establishes a network connection between client system 105 and server system 110. Such a connection may include a login process wherein a user authenticates the user's identity to the server system 110 using, for example, a username and password or other authentication schemes (e.g., digital certificates or biometric authentication). Systems that do not require authentication are also contemplated.

The server system 110 may include hardware components similar to those used by client system 105. Accordingly, the server system 110 generally includes a CPU, a memory, and a storage device, coupled to one another by a bus (not shown). The server system 110 is also running an operating system, (e.g., a Linux® distribution, Microsoft Windows®, IBM's OS/400® or AIX®, FreeBSD, and the like) that manages the interaction between hardware components and higher-level software applications.

The client/server configuration illustrated in FIG. 1, however, is merely exemplary of one hardware/software configuration. Embodiments of the present invention may be implemented using other configurations, regardless of whether the computer systems are complex multi-user computing systems, such as a cluster of individual computers connected by a high-speed network that acts as a single system, single-user workstations, or network appliances lacking non-volatile storage of their own. Additionally, although described herein using a client/server configuration, embodiments employing, distributed computing, grid computing, and peer-to-peer processing techniques are contemplated.

In one embodiment, users interact with the server system 110 using a graphical user interface (GUI). In a particular embodiment, GUI content may comprise HTML documents (i.e., web-pages) rendered on a client computer system $105_1$ using web-browser 122. In such an embodiment, the server system 110 includes a Hypertext Transfer Protocol (http) server 118 (e.g., a web server such as the open source Apache web-sever program or IBM's Web Sphere® program) adapted to respond to HTTP requests from the client system 105 and to transmit HTML documents to client system 105. The web-pages themselves may be static documents stored on server system 110 or generated dynamically using application server 112 interacting with web-server 118 to service HTTP requests from client system 105.

Alternatively, or in addition, client application 120 may comprise a database front-end, or query application program running on client system $105_N$. The application 120 may allow a user to compose an abstract query and to submit the abstract query for processing to the runtime component 114. The application 120 may include a query-building interface 115. Application 120 and query building interface 115 allow a user to compose an abstract query according to a data abstraction model 148 that describes the abstraction created over databases 214.

As illustrated in FIG. 1, server system 110 may further include runtime component 114, DBMS server 116, and data abstraction model 148. Each of these components may comprise a software program executing on the server system 110. The DBMS server 116 (or servers) generally comprises a software application configured to manage databases $214_{1-3}$. By way of illustration, the individual databases accessible through DBMS server 116 may include a relational database $214_2$ queried using an SQL query, or an XML database $214_1$ queried using an XML query. The invention, however, is not limited to any particular physical database storage mechanism and may readily be extended to operate on other such mechanisms, whether currently known or unknown. Accordingly, data storage mechanism $214_3$ illustrates other storage mechanisms managed by a DBMS server 116. Further, databases 214 may exist on the local storage system of server system 110, or may be accessed over network 104. Thus, the data abstraction created by data abstraction model 148 may be constructed over both local and federated database configurations, and combinations thereof.

In one embodiment, a user composes an abstract query using logical fields defined by a data abstraction model 148. The data abstraction model 148 defines the relationship between each logical field and data from an underlying physical database mechanism. In one embodiment, each logical field defined by the data abstraction model 148 identifies a name and an access method. The access method identifies the underlying database (e.g., databases $214_{1-3}$) where the data is located, as well as the method of access used to access the data in the underlying physical storage mechanism. Embodiments of the data abstraction model, logical fields, and access methods are described in greater detail below.

Runtime component 114 is configured to generate a query consistent with the physical representation of the data contained in one or more of the databases 214. In other words, the runtime component is the "transformational engine" used to generate the physical query (e.g., an SQL statement) from an abstract query. The runtime component 114 takes an abstract query composed by a user, identifies the information corresponding to each logical field included in the query from the data abstraction model 148, and generates a physical query run by DBMS 116 against the underlying physical storage mechanism. In one embodiment, the runtime component 114 takes an abstract query and generates an abstract query plan corresponding to a given query, and then uses the abstract query plan to generate a resolved query. Additionally, the runtime component 114 may be configured to return query results to the requesting entity.

Figure 2A:
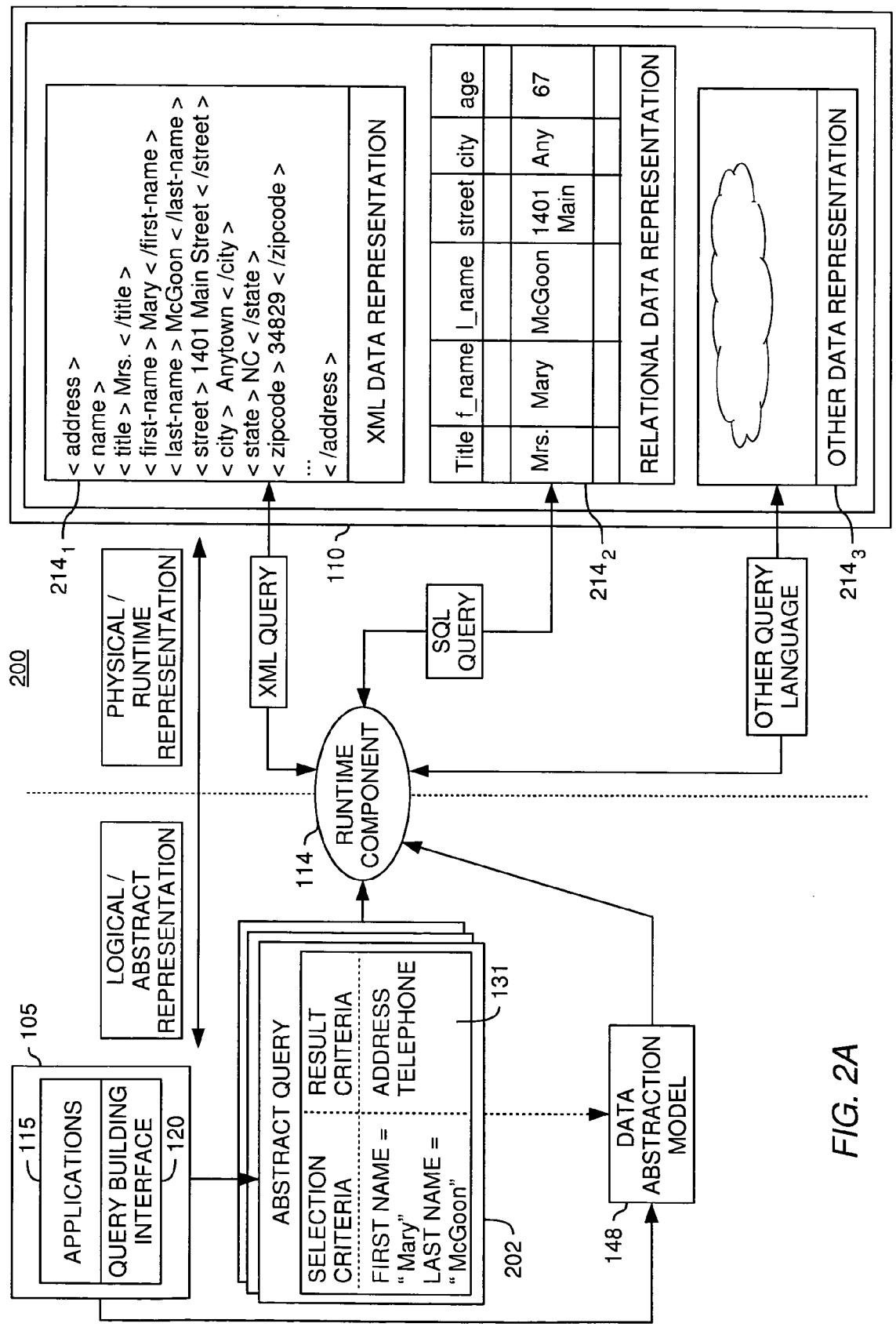
FIG. 2A illustrates a relational view of software components, according to one embodiment of the invention.

FIG. 2A illustrates a plurality of interrelated components of the invention, along with the transformation between the abstract view provided by the data abstraction model (the left side of FIG. 2A), and the underlying database mechanism used to store data (the right side of FIG. 2A).

In one embodiment, a requesting entity (e.g., a user interacting with application 115 executing on client system 105) composes an abstract query 202 using query building interface 120. The query building interface may be provided by the application 115, or may be a web-page rendered on web browser 122. The resulting query is generally referred to herein as an "abstract query" because it is composed from logical fields rather than by direct references to data entities in underlying databases $214_{1-3}$. As a result, abstract queries may be composed independently from the particular underlying relational database schema.

In one embodiment, the logical fields used to compose the abstract query 202 are defined by the data abstraction model 148. In general, the data abstraction model 148 exposes information as a set of logical fields that may be used within an abstract query to specify criteria 131 for data selection, and specify the form of result data returned from a query operation. The runtime component 114 is the bridge between the abstract representation provided by the data abstraction model 148, and the underlying physical database. For example, the runtime component 114 may transform abstract query 202 into an XML query that queries data from database 214₁, an SQL query of relational database 214₂, or other query composed according to another physical storage mechanism (whether currently known or later developed).

Logical View of the Environment

Figure 2B:
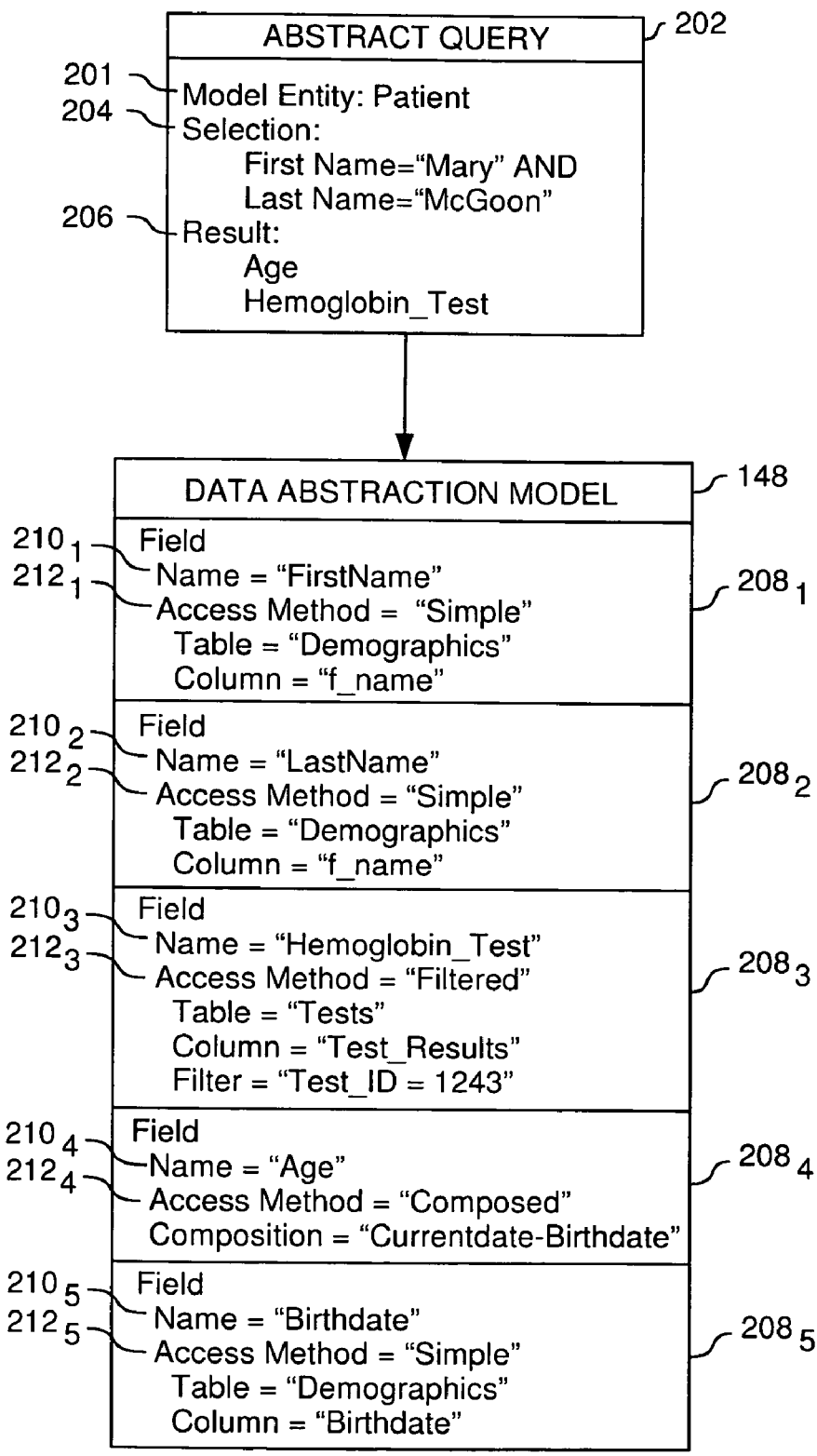
FIG. 2B illustrates an abstract query and corresponding data repository abstraction component, according to one embodiment of the invention.

FIG. 2B illustrates an exemplary abstract query 202. The query includes selection criteria 204 designed to retrieve information about a patient named "Mary McGoon." The particular information to be retrieved is specified by result criteria 206. In this case, the query retrieves an age and test results for a hemoglobin test. The actual data retrieved may include data from multiple tests. That is, the query results may exhibit a one-to-many relationship between the named patient and the test results for the patient.

In addition, abstract query 202 specifies a model entity 201, as illustrated, a "patient" model entity. Generally, model entities provide an additional layer of abstraction representing a composite of individual logical fields. Model entities provide end users and applications a higher level conceptual view that can simplify data query and modification tasks (i.e., insert, search, and deletion). In addition, model entities provide the runtime component 114 with the focus or perspective for a particular abstract query. In other words, the model entity serves to identify broad categories of data, such as a "patient" data. As an example, the "patient" model entity from abstract query 202 maps to a group of fields in the database abstraction model all related to the "patient" model entity and to underlying data sources containing patient-related data.

In one embodiment, a user specifies the model entity is being queried as part of the query building process. Which model entities are available is defined by the framework provided by the data abstraction model 148. As described below, the runtime component 114 may use the model entity selected for an abstract to select a root node when constructing an abstract query plan. Model entities may be defined by additional metadata included in the data abstraction model 148. Detailed examples of Model entities are described in further detail in a commonly owned, pending application entitled "Dealing with Composite Data through Data Model Entities," application Ser. No. 10/403,356 filed on Mar. 31, 2003 and incorporated by reference herein in its entirety.

FIG. 2B further illustrates one embodiment of a data abstraction model 148 that comprises a plurality of logical field specifications 208₁₋₅ (five shown by way of example. Collectively, logical field specifications 208₁₋₅ create an abstraction over a particular set of underlying physical databases and corresponding database schema. Those skilled in the art will recognize that multiple data repository abstraction models may be constructed over the same set of underlying physical storage mechanisms. Accordingly, abstractions may be constructed to expose different portions of data to different users, or abstractions constructed over the same data may differ, and may be customized to the needs of a particular user (or group of users).

The logical fields shown in FIG. 2B illustrate an abstraction constructed over a relational database. That is, the access methods included in field specifications 208 define a mapping between the logical field and tables and columns from a relational database (e.g., database 214₂ from FIG. 2A). The data abstraction model 148 provides a logical field specification 208 for each logical field available for composition of an abstract query (e.g., abstract query 202). The logical field specification 208 stores a definition for each logical field, and any associated metadata. As illustrated, each field specification 208 identifies a logical field name $210_{1-5}$ and an associated access method $212_{1-5}$. The runtime component 114 uses the access method to map a logical field to a particular physical data storage mechanism 214. Depending upon the number of different types of logical fields, any number of access methods is contemplated. As illustrated in FIG. 2B, access methods for simple fields, filtered fields, and composed fields are provided.

Field specifications $208_1$, $208_2$ and $208_5$ each provide a simple access method $212_1$, $212_2$, and $212_5$. The simple access method provides a direct mapping to a particular entity in the underlying physical data representation. When this is a relational database, the simple access method maps the logical field to an identified database table and column. For example, the simple field access method 212, shown in FIG. 2B maps the logical field name $210_1$ ("FirstName") to a column named "f_name" in a table named "Demographics." The logical field specification 208 may also include metadata indicating how the logical field is related to other entities in the data abstraction model 148.

Field specification $208_3$ exemplifies a filtered field access method $212_3$. Filtered access methods identify an associated physical entity and provide rules used to define a particular subset of items within the physical data representation. Consider, for example, a relational table storing test results for a plurality of different medical tests. Logical fields corresponding to each different test may be defined, and the filter for each different test is used to identify when a particular test is associated with a logical field. An example is provided in FIG. 2B in which the access method for filtered field $212_3$ maps the logical field name $210_3$ ("Hemoglobin Test") to a physical entity in a column named "Test_Result" in a table named "Tests" and defines a filter "Test_ID='1243.' Accordingly, the filtered field acts as selection criteria used to restrict items from a larger set of data, without the user having to know the specifics of how the data is represented in the underlying physical storage mechanisms or to specify the selection criteria as part of the query building process.

Field specification $208_4$ exemplifies a composed access method $212_4$. Composed access methods generate values from one or more physical data items, or data returned by other logical fields, using an expression supplied as part of the access method definition. In this way, information which does not directly exist in the underlying data representation may be computed and provided to a requesting entity. In the example illustrated in FIG. 2B the composed field access method $212_3$ maps the logical field "Age" to another logical field $208_5$ named "birth date" The logical field "birthdate" $210_5$ maps to a column in the demographics table. The composition expression is used to compute a value for the composed field. In this example, an age value is computed by subtracting the current date from the birth date value returned by the "birth date" logical field.

By way of example, the field specifications 208 of the data repository abstraction component 148 shown in FIG. 2B are representative of logical fields mapped to data represented in the relational data representation $214_2$. However, other instances of the data repository abstraction component 148 or other logical field specifications may map to other physical data representations (e.g., databases $214_1$ or $214_3$ illustrated in FIG. 2A).

An illustrative abstract query corresponding to abstract query 202 is shown in Table I below. In this example, the abstract query 202 is represented using XML. In one embodiment, application 115 may be configured to generate an XML document to represent an abstract query composed by a user interacting with the query building interface 120 or web browser 122. Those skilled in the art will recognize that XML is a well known language used to facilitate the sharing of structured text and information, other languages, however, may be used.

TABLE I

QUERY EXAMPLE

```
001  <?xml version="1.0"?>
002  <!--Query string representation: (FirstName = "Mary"
     AND LastName =
003  "McGoon") OR State = "NC"-->
004  <QueryAbstraction>
005      <Selection>
006          <Condition internalID="4">
007              <Condition field="FirstName" operator="EQ"
                     value="Mary"
008  internalID="1"/>
009              <Condition field="LastName" operator="EQ"
                     value="McGoon"
010  internalID="3" relOperator="AND"></Condition>
011          </Condition>
012      </Selection>
013      <Results>
014              <Field name="Age"/>
015              <Field name="Hemoglobin_test"/>
016      </Results>
017      <Entity name="Patient" >
018              <EntityField required="Hard" >
019                  <FieldRef
                         name="data://Demographic/Patient ID" />
020                  <Usage type="query" />
021              </EntityField>
022      </Entity>
023  </QueryAbstraction>
```

The abstract query shown in Table I includes a selection specification (lines 005-012) containing selection criteria and a results specification (lines 013-016). In one embodiment, a selection criterion consists of a field name (for a logical field), a comparison operator (=, >, <, etc) and a value expression (what is the field being compared to). In one embodiment, the result specification is a list of logical fields that are to be returned as a result of query execution. The actual data returned is consistent with the selection criteria. The model entity "patient" is identified on line 017 and associates the model entity with the patient ID column of the demographic table (line 019).

Abstract Query Processing

Figure 3:
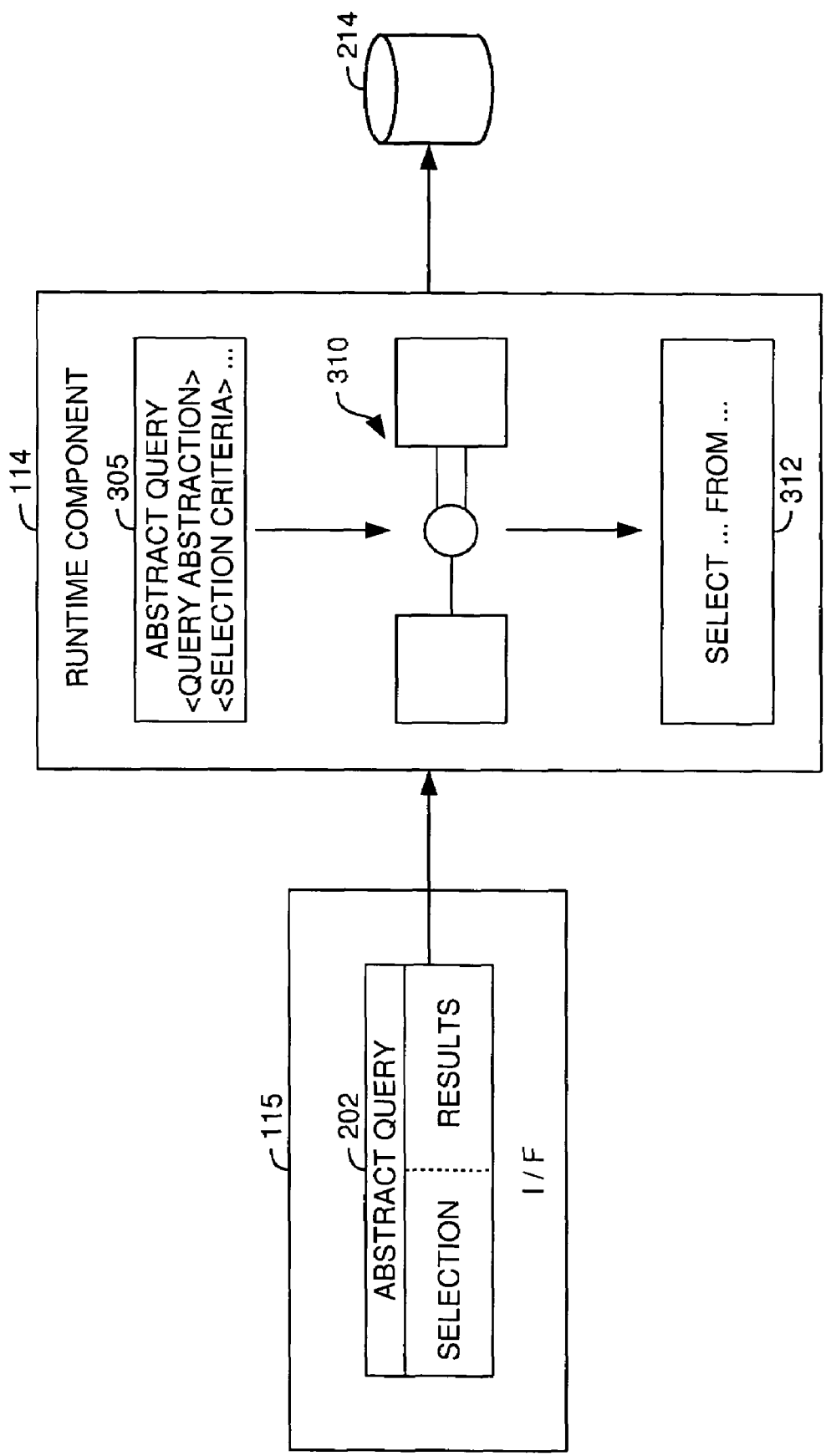
FIG. 3 illustrates a runtime component processing an abstract query by creating an intermediate representation of the abstract query subsequently used to create a resolved query, according to one embodiment of the invention.

FIG. 3 illustrates operations of runtime component 114, according to one embodiment of the invention. As described above, the runtime component 114 is configured to receive an abstract query, and in response, to generate a query of an underlying physical data storage mechanism, such as a relational database. Queries may be saved, cached, and shared among different users. Once completed and selected for execution, the query is delivered to the runtime component 114. In one embodiment, the query is transmitted across network 104 to system 110 using well-known data communications protocols.

Once received, runtime component 114 processes the abstract query 305. In one embodiment, the runtime component 114 receives the abstract query 305 in a structured form, such as XML, like the query illustrated in Table I. From abstract query 305, runtime component first builds an intermediate representation of the query. In one embodiment, the intermediate representation comprises an abstract query plan that includes a combination of abstract elements from the data abstraction model and elements relating to the underlying physical data storage mechanism.

For a data abstraction model constructed over a relational database, an abstract query plan includes all the information about which relational tables need to be available, and how to join the tables together (i.e., the relationships between the tables or between the logical fields, conditions on data retrieved.) From this the runtime component generates an SQL statement 312 used to query database 214.

Constructing an Abstract Query Plan

As described above, an abstract query plan includes the logical fields used in an abstract query, indicates the physical data sources corresponding to the fields, and how to join data from the required data sources. Accordingly, the runtime component 114 needs to have available a representation of the structure or schema of the database abstracted by the database abstraction model to process an abstract query.

Figure 4A:
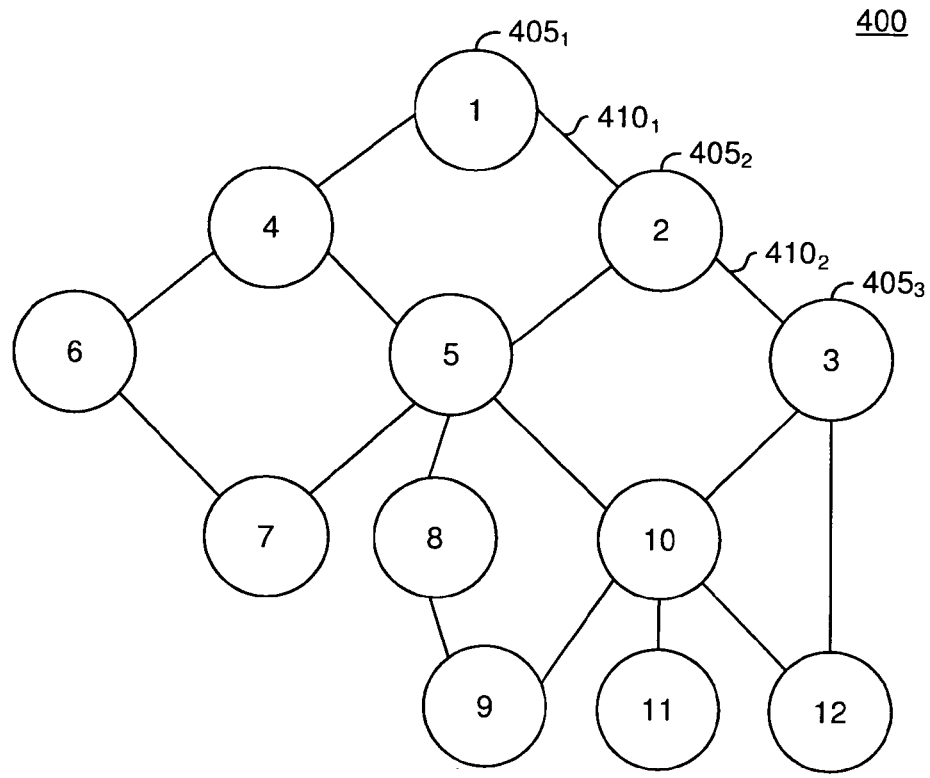
FIGS. 4A and 4B illustrate a graph that models the relationships between tables in an underlying relational database.

FIG. 4A illustrates a graph representation 400 of an underlying database. This representation 400 is used to define the relationships between data sources in the underlying physical storage mechanism. In one embodiment, the runtime component 114 uses graph representation 400 to identify data sources that contain data relevant to a given abstract query. The graph representation 400 structure is derived from the underlying physical database structure being abstracted as part of the data abstraction model 148 and available to the runtime component 114 during query processing.

Where the underlying physical storage mechanism is a relational database, the relational schema may be used to generate the graph representation 400. Each node 405 (three nodes labeled for illustration) of the graph 400 may represent an actual table from the underlying relational schema, or may represent a table defined from one or more actual tables, such as a database view or a common table expression. The relationships may also be derived from metadata provided by the data abstraction model 148 that indicates relationships between different logical fields and physical data sources. For example, the data abstraction model 148 may include a "relations" section that indicates one-to-one and one-to-many relationships between fields. Connecting the nodes are edges 410. As illustrated, node 1 and node 2 are connected by edge 410$_1$, and node 2 and node 3 are connected through edge 410$_2$. Also, as illustrated, node1 and node 3 are connected, through node 2. Other nodes are similarly connected.

Edges 410 represent how data from different nodes may be joined together i.e., the relationships between data located in different nodes. Such relationships may include both one-to-one and one-to-many relationships. Runtime component 114 uses representation 400 and a given abstract query to identify a sub graph used to generate an abstract query plan. That is, while the graph representation 400 represents the entire database abstracted by the database abstraction model, only the nodes and edges necessary to respond to a given abstract query are needed to create an abstract query plan. Accordingly, the runtime component 114 constructs a sub graph from graph representation 400 that includes a minimally necessary set of nodes and edges. When processing the abstract query, the runtime component 114 only needs the nodes that contain data relevant to the abstract query.

Figure 4B:
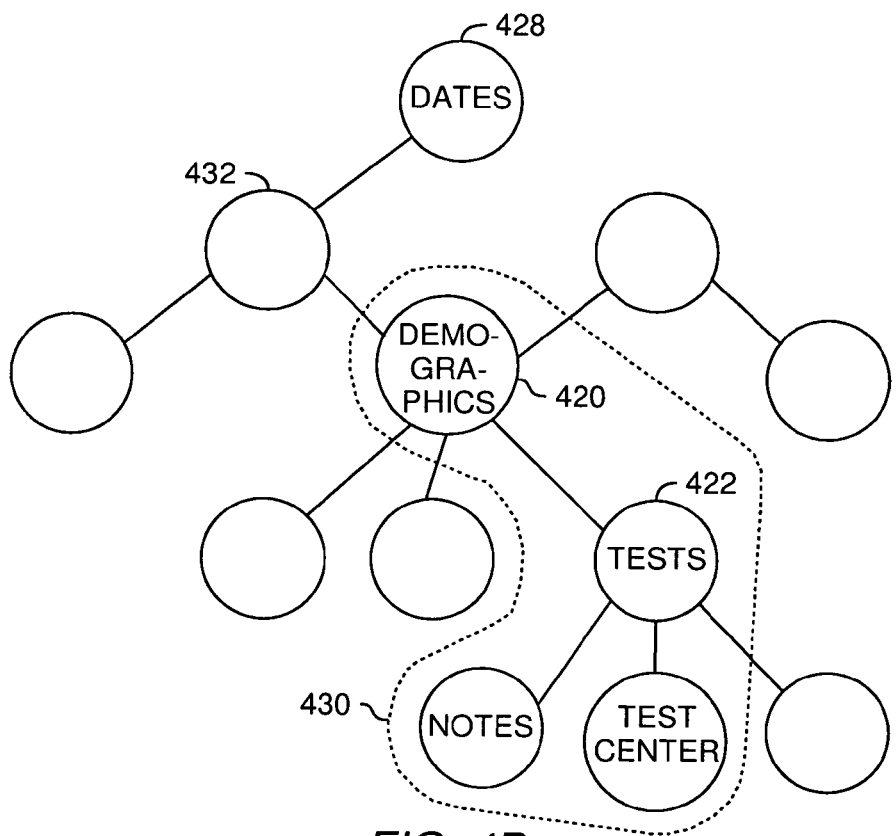

Most queries, however, will not need data from each node of graph representation 400. Accordingly, FIG. 4B illustrates a modified version of the database structure from FIG. 4A. The sub graph 430 includes only the nodes needed for a particular abstract query. Additionally, the graph has been altered to remove any repeating paths between nodes. This prevents the runtime component 114 from becoming stuck in a repeating loop while processing an abstract query. Such a path may occur when edges connect nodes in a cycle. For example, the path: 1→2→5→4→1 is an example of a cyclic path through the graph representation 400. This path is severed by removing the edge 410₁ between node 1 and node 2. In one embodiment, any cyclic paths that are present in a sub graph of nodes (e.g., sub graph 430), are severed prior to generating an abstract query plan.

In one embodiment, the first step in constructing an abstract query plan is to create a model of the underlying data representation that includes only the nodes and edges (in other words, the data and relationships between data sources) necessary for a particular abstract query. The node that includes data related to the model entity for the abstract query is placed at the root of sub graph 430. For example, the "patients"model entity specified for abstract query 202 illustrated in FIG. 4, specifies that the model entity being queries is the "patient" model entity. Accordingly, demographics node 420 is used as the root node for abstract query 420.

In one embodiment, generating sub graph 430 representation may comprise generating a Steiner tree representation of the nodes (data sources) and edges (relationships between nodes) needed for an abstract query. As those skilled in the art will recognize, a Steiner tree is a minimum-weight connected sub graph that includes a set of required nodes. The node that includes data related to the model entity for the abstract query is placed at the root of the tree, and the distance to the terminal nodes is minimized to generate sub graph 430. As illustrated in FIG. 4B, nodes 420, 422, 424 and 426 are selected. In this example, each node selected for the sub graph 430 also contains data needed to process the query, but this result is not required. For example, if abstract query 202 also required data from the "doctors" data source node 428, then the node 432 would be included in the sub-graph 430, even though it would only serve to connect node 428 to the demographics node 420.

Sub graph representation 430 generated by the runtime component is using relationships between data specified in the data repository abstraction component. In one embodiment, a user may be presented with the initial sub graph representation 430 and given the opportunity to modify the initial graph representation. Alternatively, or in addition, the user may be presented with an interface allowing the user to specify additional, or different, relations between the data sources illustrated in graph 400. For example, as illustrated in sub graph representation 430, the demographic data source is connected through the tests data source to the notes data source. However, the notes data source could also be connected through node 8 illustrated in FIG. 4A. This could be advantageous, for example, where the tests table is very large, making using it only for a join process very inefficient. In such a case a sophisticated user or database administrator could specify the preferred sub graph representation to use for query processing.

Once sub graph 430 is determined for a particular abstract query, the runtime component 114 generates a set of table instances (described in greater detail below with respect to FIG. 6). Each table instance corresponds to a node from the sub graph representation 430. In one embodiment, an abstract query plan comprises a set of one or more table instances along with a set of join relationships and metadata about the join relationships. Each table instance may comprise a data structure used by runtime component 114 that includes a combination of both logical data from the data abstraction model, and physical data (e.g., tables and columns) from the underlying physical storage mechanism.

Figure 5:
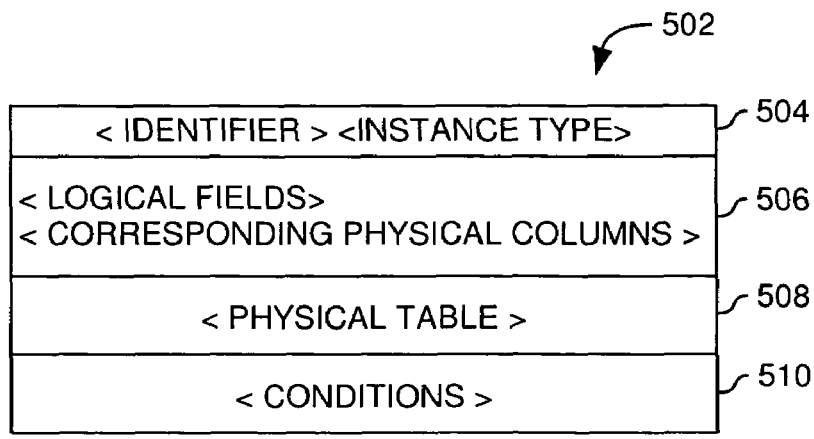
FIG. 5 illustrates a table instance data structure component of an abstract query plan, according to one embodiment of the invention.

FIG. 5 shows an illustration of one embodiment of a table instance 502 data structure. As illustrated, table instance 502 includes fields section 506, table section 508, conditions sections 510. Table section 508 identifies the underlying physical data source (e.g., a relational table, view, or common table expression for a relational data source) where the data corresponding to the fields section 506 is located. In addition, conditions section 510 specifies the restrictions on the data specified for the logical fields included in the abstract query.

Table instance 502 includes an identifier 504 used to identify each distinct table instance. In addition, the identifier 504 may include attributes that describe the purpose for the table in the abstract query plan. For example, attributes may classify a table instance as an informational table that is used to select data returned for an abstract query (e.g., the results criteria 204 from abstract query 202) or as a conditional table used to represent the conditional restrictions included in the abstract query.

The runtime 114 component is configured to divide conditions and logical fields specified in the abstract query and group them into units. Each unit includes the logical fields that are applied against the same data source. In other words, all of the logical data (e.g., fields and conditions) included in a particular table instance correspond to data present in the data source indicated by table section 508 for the specific table instance. Particular examples of a table instances and there use as part of an abstract query plan is further described in reference to FIG. 6.

Figure 6:
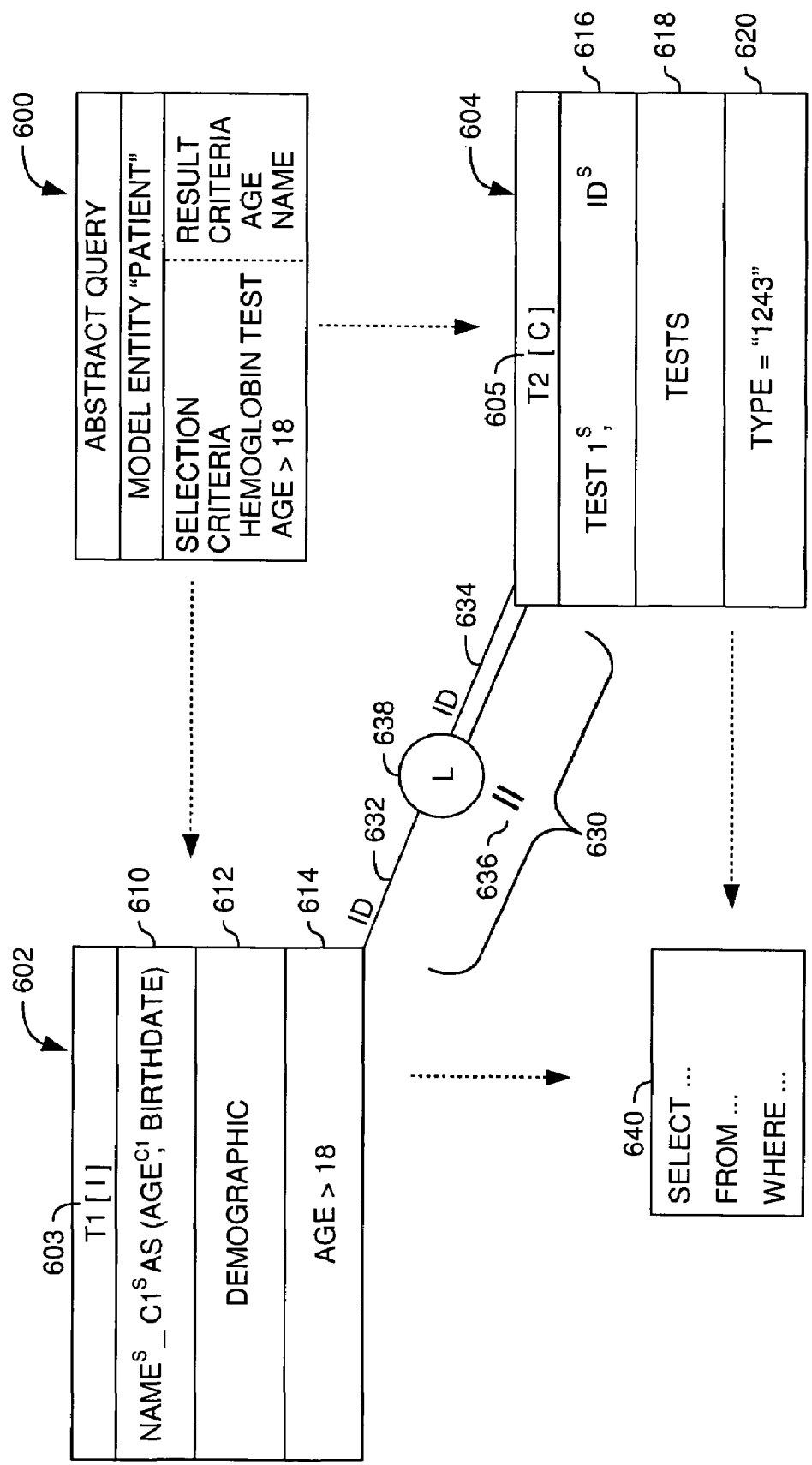
FIG. 6 illustrates an exemplary abstract query plan, according to one embodiment of the invention.

FIG. 6 illustrates an example of an abstract query plan generated from abstract query 600. Using the database abstraction model 148, and query building interface 120 a user composes abstract query 600 and submits it to the runtime component 114 for processing. In this example, the user has specified the model entity "patient." Abstract query 600 includes selection fields of "hemoglobin test" and the result criteria "age>18" and results criteria of patient name and age. Thus, the query should retrieve the name and age of any patient with data in the underlying database who has taken a hemoglobin test, and whose age is greater than 18.

Table instance "t1" and "t2" are part of an abstract query plan that corresponds to the abstract query 600. Each table includes field sections (610 and 616), data source sections (612 and 618), and condition (614 and 620). Table instance 602 labeled "t1" incorporates the selection criteria specified by abstract query 600. Data source section 612 indicated that all of the logical fields included in this table instance 602 depend on data from the demographic node (e.g., node 420 illustrated in FIG. 4B). As illustrated, table 602 includes an attribute 603 indicating that the table instance is an informational table (i.e., a data source section 612 stores data that will be included in user results). Field selection data 610 includes "Name," a simple logical field that maps to a patient's name, and "C1," used to represent "composed field one" identified as an Age logical field composed from birthdate. As illustrated, these fields are decorated with a superscript "s" signifying that the field is used to select data returned to a user. When implemented for execution in a computer system (e.g., server system 110), these attributes are stored as part of the data structure used to represent a table instance. Condition section 614 includes the group of conditions used to restrict the data selected from data source 612, in this case, the age condition restriction and the "demographic" data source 612.

Table instance 604 is labeled with the identifier "t2" and incorporates the selection conditions from abstract query 600 in the abstract query plan. Table attribute 605 indicates that the table is a conditional table, i.e., it corresponds to the selection conditions included in the abstract query. In one embodiment, where the abstract query plan is used to build an SQL query of a relational DBMS, conditional tables may become part of the "where" clause for the SQL statement. Fields section 616 includes the "Test1" and "ID" fields. The data source for table instance 604 is the "tests" table 618. In addition, the condition section 620 includes the "type='1243'" condition that is not directly specified by the query. This condition, however, is implicitly included in the query from the "hemoglobin" test logical field that maps to data using a filtered field.

The two table instances are joined by the join relationship 630. The join between the demographic table instance 602 and the tests table instance 604 is a one-to-many relationship. That is, each patient (the model entity) may have many tests. In one embodiment, relationships between logical fields may be specified in the data abstraction model 148. The abstract query plan illustrated in FIG. 6A depicts this relationship using the single line segment 632 and double line segment 634. In addition, the join relationship includes a join type attribute 638. As illustrated, the join indicates a "left" join.

Those skilled in the art will recognize a "left" join as a common type of relationship between tables in a relational database, and that other join types may be "right" or "inner," depending on the abstract query being processed. The join type indicates how to bind data together, across table instances without repeating all of the data in every table. Attribute 636 (illustrated using the Roman numeral "II") indicates to the runtime component that the data is being selected from a filtered field. When generating a resolved query for a filtered field, the runtime component 114 may be configured to generate a sub-select statement from the data source indicated by the table instance. As illustrated, the tests data source 618 may include test results from many types of tests, including the hemoglobin test referenced by one of the selection logical fields of abstract query 600. The filtered field "hemoglobin test" is used to retrieve only hemoglobin test results from this test's data source using the filtered condition 620; namely, "type=1243."

Those skilled in the art will recognize that the abstract query plan illustrated in FIG. 6 is illustrative, and generated from the specific abstract query 600. The abstract query plan generated for other abstract queries will depend on the information included in each particular abstract query.

Once constructed, the abstract query plan may be optimized prior to generating a resolved query statement. As described above, one goal in creating the abstract query plan is to generate as efficient a resolved query as possible given the information available to the runtime component 114. Accordingly, in one embodiment the runtime component may make multiple passes over the abstract query plan to perform any number of different optimizations on the abstract query plan.

Additionally, users may be presented with the abstract query plan and given the opportunity to select what optimizations to perform, or to modify the abstract query plan directly. For example, if the abstract query plan generated by the runtime component creates an abstract query plan with multiple table instances of a large table (e.g., a tests table), then one user selected optimization would allow a user to direct the runtime component 114 to minimize the number of table instances for the large table. Or the user may specify a different set of conditions to use when generating the abstract query plan. Because multiple abstract query plans may be possible, a user may be presented with the opportunity to trade off the benefits of competing plans to select the one that will be the most efficient. For example, if both a tests table (large) and a diagnosis table (small) are available, joining through the small table may be the more efficient choice.

Another possible optimization is to transform a set of filtered fields specified for an abstract query into a single query without the filter. This optimization would be useful where a user composes an abstract query using the same filtered field multiple times. Generally, when used to query a relational database filtered fields resolve to a sub select SQL query statement. Performing the same sub select statement multiple times, however, is highly inefficient. Accordingly, another optimization would be to create a common table expression for the filtered field instead of the multiple sub select statements. Those skilled in the art will recognize that the optimizations described above are exemplary, and further, that once constructed, the abstract query plan provides a platform for many different optimizations that may be selected by a user or by the runtime component 114 inspecting the abstract query plan prior to creating the resolved query.

Once the abstract query plan is constructed, the runtime component 114 generates a query of the underlying physical data storage mechanism. Where this comprises a relational DBMS, the runtime component traverses the abstract query plan to generate an SQL statement. In one embodiment, the runtime component 114 may traverse through the table instances to generate SQL fragments for each table instance, and then join the instances together as specified in the join relationships determined for the abstract query for the abstract query plan.

To complete the processing of the illustrative abstract query plan depicted in FIG. 6, the runtime component 114 traverses the abstract query plan to generate SQL statement 640. The runtime component 114 begins at table instance 602 that includes the model entity for the abstract query plan. From table instance 602, the runtime component 114 generates a portion of the resolved query 640 that includes the selection criteria of name and age. Next, the runtime component 114 generates SQL statements to include the conditions specified in conditional table instance 604.

The abstract query plan thereby provides a set of discrete objects tied to both the abstract logical fields and the underlying physical data sources. Rather than attempt to create a resolved query directly, the abstract query plan provides an intermediate representation of the abstract query. This intermediate representation provides a formal data structure that may be systematically traversed to generate the correct resolved query from any abstract query.

Operational Methods

Figure 7:
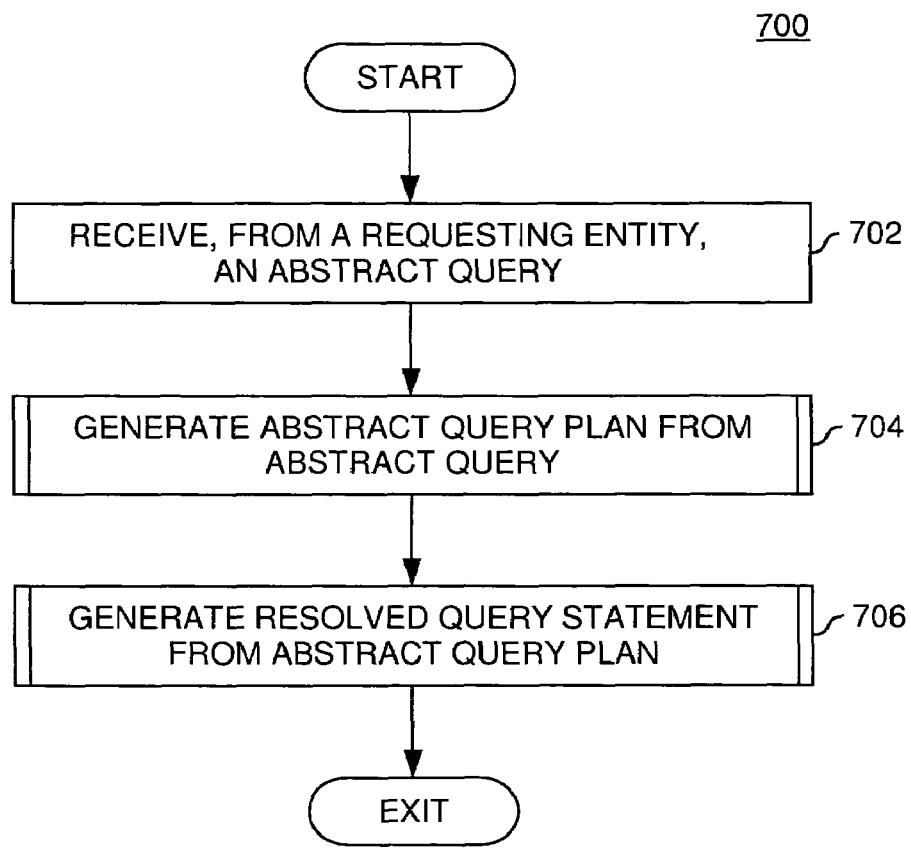
FIG. 7 illustrates a method for processing an abstract query, using an abstract query plan intermediate representation of the abstract query, according to one embodiment of the invention.

FIG. 7 illustrates a flow diagram of the operations 700 of runtime component 114 to process an abstract query. Operations 700 correspond to the transformation illustrated in FIG. 3 of the abstract query 305, intermediate representation 310, and the resolved query 312. The method begins at step 702 wherein the runtime component 114 receives, from a requesting entity, an abstract query. The query is composed using query building interface 115, or may also be a saved query composed earlier, by the same or different users. In this way the same abstract query may be used for different underlying databases. That is, the same logical fields may be constructed over different underlying database representations by changing the access methods to account for the same information stored using a different schema or underlying storage mechanism. The abstraction provided by the logical fields and data abstraction model hides the differences in the underlying systems.

Next, at step 704, the runtime component 114 generates an abstract query plan from the abstract query. In one embodiment, the abstract query plan comprises a set of table instances constructed from a given abstract query and a sub graph of the underlying physical database. Next, the runtime component 114 traverses the abstract query plan to generate a query consistent with the storage format of the underlying data storage mechanisms. For example, where the underlying storage mechanism is a relational database, the runtime component 114 generates an SQL statement provided to the relational DBMS for execution. Once the abstract query plan is complete, the runtime component 114 may traverse through the abstract query plan, beginning at the model entity root node, to generate a resolved query of the underlying physical database.

Figure 8:
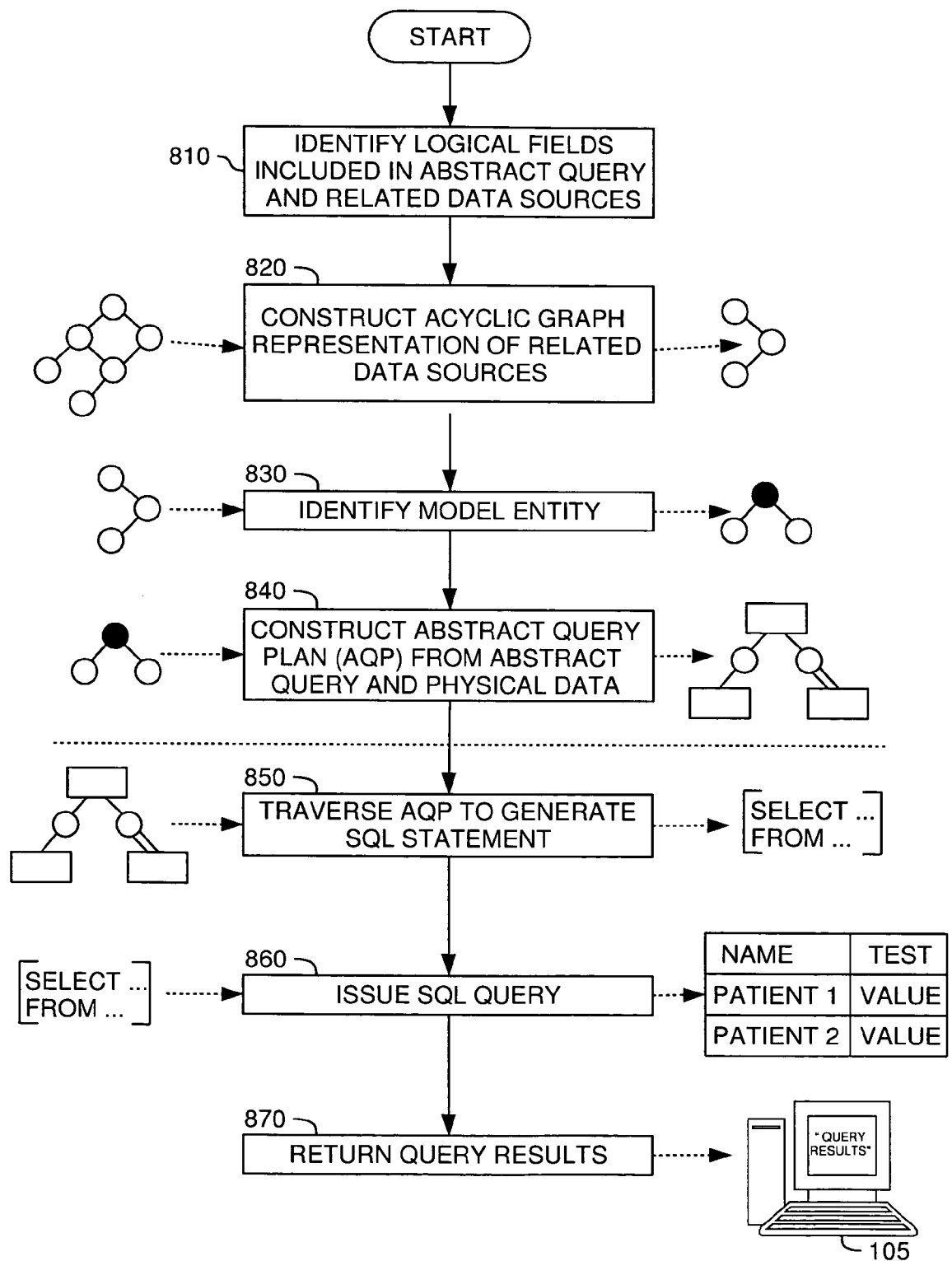
FIG. 8 illustrates a method for creating a resolved query from an abstract query, according to one embodiment of the invention.

FIG. 8 illustrates a method for generating an abstract query plan, according to one embodiment of the invention. The method begins at step 810 after runtime component 114 has received an abstract query. As described above, the abstract query may be composed using query building interface 115. At step 810, each logical field included in an abstract query is identified, and the definition for the field is retrieved from the data abstraction module 148. Next, at step 820, the runtime component retrieves a graph representation of the underlying physical database, like the graph structures illustrated in FIGS. 4A and 4B. From this representation the runtime component 114 creates an acyclic model of the database that includes all the nodes required either as data source or conditional requirements of the query, and may include any backbone nodes needed to connect to nodes of the query.

At step 830, the node in the graph representation corresponding to the model entity being queried is identified. As described above, each abstract query is focused on a model entity depending on the focus of the query desired by a user. The data abstraction model 148 defines how the model entity is related to data in the underlying physical data storage (e.g., a column from a relational table). Once identified, the runtime component 114 constructs a set of table instances corresponding to the nodes of the sub graph, logical fields, and conditions specified either by the query directly or implicitly as part of a filtered or composed logical field. The runtime component completes the abstract query plan by joining the table instances according to the join relationships provided by the graph representation of the database, and any relationship data provided by data abstraction model.

At step 850, after the abstract query plan is completed, the runtime component 114 traverses the abstract query plan to generate a resolved query from each table instance, joined according to the identified join relationships. This resolved query is supplied to the DBMS managing the underlying data source (e.g., a relational database) for execution. In one embodiment, multiple query fragments may be generated and processed by the DBMS 116. In such an embodiment, the runtime component may be configured to merge the results generated from each sub query. At step 870, the results may be formatted and returned to the user. In one embodiment, this may comprise returning a set of query results formatted as HTML for web browser 122. Alternatively, this may comprise returning results to application 120 that displays the results, or may also perform additional analysis, such as a statistical analysis configured to issue an abstract query and analyze the results.

While the foregoing is directed to embodiments of the present invention, other and further embodiments of the invention may be devised without departing from the basic scope thereof, and the scope thereof is determined by the claims that follow.

What is claimed is:

1. A method of processing an abstract query, comprising:
receiving, from a requesting entity, an abstract query composed from a plurality of logical fields, wherein each logical field specifies (i) a name used to identify the logical field, (ii) an access method that maps the logical field to a data source in a database;
identifying (i) a set of data sources referenced by the plurality of logical fields in the abstract query and (ii) a set of relationships between the set of data sources;
determining an acyclic graph representation of the set of data sources;
generating an abstract query plan, wherein the abstract query plan comprises:
(a) a plurality of table instances, wherein each table instance includes:
(i) an indication of a data source associated with that table instance;
(ii) each of the logical fields included in the abstract query that depend on data present in the indicated data source; and
(iii) conditions used to limit data selected from the indicated data source; and
(b) a set of join relationships that indicates how the plurality of table instances are related to one another;
performing at least one optimization of the abstract query plan to generate an optimized abstract query plan; and
traversing the optimized abstract query plan to generate a resolved query of the set of data sources.

2. The method of claim 1, wherein the optimization comprises (i) modifying the set of join relationships or (ii) reducing a number of identical table instances included in the abstract query plan.

3. The method of claim 1, further comprising,
providing the resolved query to the a database management system configured to manage the data stored in the database;
receiving a set of query result data; and
returning the set of query result data to the requesting entity.

4. The method of claim 1, wherein the graph representation of the relational database comprises a graph representation wherein each node represents a data source, and each edge represents a relationship between data sources.

5. The method of claim 1, wherein the set of data sources comprise a set of tables in a relational database and wherein the set of relationships between the data sources comprise primary key and foreign key relationships.

6. The method of claim 1, wherein the database comprises a federated database defined using a relational schema constructed from a plurality of individual relational databases.

7. The method of claim 1, wherein acyclic graph representation of the set of data sources comprises a Steiner tree representation, wherein the root node of the Steiner tree corresponds to a model entity identified by the abstract query.

8. The method of claim 1, wherein the access method for each logical field is selected from one of a simple, filtered, or composed access method.

9. The method of claim 1, wherein creating a resolved query of the set of data comprises generating an SQL statement.

10. The method of claim 1, wherein the query building interface comprises a web-based interface accessed using an internet web browser application.

* * * * *